US009591089B2

(12) United States Patent
Herger et al.

(10) Patent No.: US 9,591,089 B2
(45) Date of Patent: *Mar. 7, 2017

(54) CONTENT PREVIEW GENERATION USING SOCIAL NETWORK ANALYSIS

(71) Applicant: International Business Machines Corporation, Armonk, NY (US)

(72) Inventors: Lorraine M. Herger, Port Chester, NY (US); Neal M. Keller, Pleasantville, NY (US); James R. Kozloski, New Fairfield, CT (US); Matthew A. McCarthy, Holly Springs, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,046

(22) Filed: Jan. 21, 2016

(65) Prior Publication Data
US 2016/0142501 A1    May 19, 2016

Related U.S. Application Data

(63) Continuation of application No. 14/209,062, filed on Mar. 13, 2014, now Pat. No. 9,270,714.

(51) Int. Cl.
*H04L 29/08*    (2006.01)
*H04L 29/06*    (2006.01)
(Continued)

(52) U.S. Cl.
CPC ............ *H04L 67/22* (2013.01); *G06F 17/241* (2013.01); *G06F 17/3089* (2013.01);
(Continued)

(58) Field of Classification Search
CPC .............................. H04L 67/22; H04L 67/306
(Continued)

(56) References Cited

U.S. PATENT DOCUMENTS 7,689,556 B2    3/2010  Garg et al.
8,091,032 B2    1/2012  Fischer
(Continued)

OTHER PUBLICATIONS

"On Peer-To-Peer Multimedia Content Access and Distribution"—Liu et al, IEEE, Dec. 2008 http://www.comm.toronto.edu/~dkundur/pub_pdfs/LiuYuKunMerICME06.pdf.*
(Continued)

*Primary Examiner* — Randy Scott
(74) *Attorney, Agent, or Firm* — Fleit Gibbons Gutman Bongini Bianco PL; Jon Gibbons

(57) ABSTRACT

Disclosed is a system and method for generating a preview of a digital content item using social network analysis. Members of a social network who acquire the digital content item may identify interesting portions of the digital content. When a member of the social network requests a preview of the digital content item, typically in anticipation of an acquisition of the digital content item, the interesting portions of the digital content item identified by fellow social network members are considered in the generation of the preview. Selection of the interesting content for preview may include more identified content, as well as social network relationship and role magnitudes. The digital content item may include: text, such as books or articles; multimedia such as audio/video; and interactive, such as games or virtual worlds.

18 Claims, 6 Drawing Sheets

(51) Int. Cl.
    *G06F 17/30* (2006.01)
    *G06F 17/24* (2006.01)
    *H04L 12/58* (2006.01)
    *G06Q 50/00* (2012.01)
    *G06Q 30/06* (2012.01)

(52) U.S. Cl.
    CPC ......... *G06Q 30/0631* (2013.01); *G06Q 50/01* (2013.01); *H04L 51/32* (2013.01); *H04L 65/403* (2013.01); *H04L 67/306* (2013.01)

(58) Field of Classification Search
    USPC .............. 709/204, 205, 206, 207; 705/14.46, 705/14.53, 14.66, 14.73
    See application file for complete search history.

(56) References Cited

U.S. PATENT DOCUMENTS

| | | | |
|---|---|---|---|
| 8,095,432 | B1 | 1/2012 | Berman et al. |
| 8,832,233 | B1* | 9/2014 | Brin ................ H04L 29/06476 709/203 |
| 9,130,950 | B2 | 9/2015 | Waytena, Jr. ........... H04W 4/16 |
| 2008/0209351 | A1 | 8/2008 | Macadaan et al. |
| 2009/0100469 | A1 | 4/2009 | Conradt et al. |
| 2010/0287033 | A1 | 11/2010 | Mathur |
| 2011/0029666 | A1* | 2/2011 | Lopatecki ............... G06F 15/16 709/224 |
| 2011/0113320 | A1 | 5/2011 | Neff ...................... G06F 17/241 715/230 |
| 2011/0320380 | A1 | 12/2011 | Zahn et al. |
| 2012/0117167 | A1 | 5/2012 | Sadja et al. |
| 2013/0066973 | A1 | 3/2013 | Macadaan et al. |
| 2014/0023348 | A1* | 1/2014 | O'Kelly ............... G11B 27/031 386/278 |
| 2015/0237402 | A1 | 8/2015 | Lee ...................... H04N 21/251 725/46 |

OTHER PUBLICATIONS

Kempe, D., et al., Maximizing the spread of influence through a social network, Proceedings of the Ninth ACM SIGKDD International Conference on Knowledge Discovery and Data Mining, Aug. 2003, pp. 137-146. Copyright 2003 ACM 1•58113•737•0/03/0008.

Cha, M., et al., "A measurement-driven analysis of information propagation in the flickr social network," Proceedings of the 18th International Conference on World Wide Web, Apr. 2009, pp. 721-730. ACM 978-1-60558-487—4/09/04.

Iyengar, R., et al., "Do friends influence purchases in a social network?," Harvard Business School Marketing Unit Working Paper 09-123, Feb. 2009, 36 pages, copyright 2009 by Raghuram Iyengar, Sangman Han, and Sunil Gupta.

"Social Media Recommendation"—Wang et al, Tsinghua University Oct. 2012 http://media.cs.tsinghua.edu.cn/~wangzhi/publications/zhl-springer-chapter-0.pdf.

* cited by examiner

CONTENT PREVIEW GENERATION USING SOCIAL NETWORK ANALYSIS

BACKGROUND

The present description generally relates to generating previews of content based upon the social network analysis.

The internet and other computer based networks have become an effective media for the distribution of digital content items such as books, movies and interactive games. As part of the distribution of such content, previews are provided to potential customers browsing the content. Previews are abbreviated portions of the content that attempt to highlight most interesting portions of the content and are typically generated for a large number of potential customers. The highlighted content may not actually be the most interesting portion of the content to any particular potential customer.

Once delivered, the interesting portions of the content are identified by those consuming the content. Interesting passages in a book are highlighted, favorite movie scenes are flagged or favorite locations in a virtual world or game are identified. This identification can be done on content presentation devices such as e-readers, personal computers, and video game consoles. However, an interesting portion of content identified by one person may not be a very interesting portion of the content to another person.

Content consumers may be members of any of a multiplicity of social networks that share a common interest. Generating content previews that highlight interesting portions of the content for a particular individual previewing the content may help the individual make a more informed decision before acquiring and investing time in consuming the content.

SUMMARY

Disclosed is a novel system and method generating a preview of a digital content item based upon social network relationships and interesting portions of the digital content item identified by social network members.

In one example, a method operating within a content distribution server comprises identifying a first interesting portion of a digital content item having a plurality of portions, the first interesting portion identified based upon a first input signal received at a first content presentation device, the first content presentation device operated by a first person associated with a first social network; identifying a second interesting portion of the digital content item, the second interesting portion identified based upon a second input signal received at a second content presentation device, the second content presentation device operated by a second person associated with a second social network; determining that a third person operating a third content presentation device is associated with the first social network; determining that a fourth person operating a fourth content presentation device is associated with the second social network; generating a first digital content preview of the digital content item for presentation on the third content presentation device, the first digital content preview including the first interesting portion based upon the third person being associated with the first social network; and generating a second digital content preview of the digital content item for presentation on the fourth content presentation device, the second digital content preview including the second interesting portion based upon the fourth person being associated with the second social network.

In another example, a content distribution server comprises: a content distributor having a digital memory for storing a digital content item having a plurality of portions, the content distributor for distributing the digital content item to a first content presentation device and second content presentation device; an interesting portion analyzer coupled to the first and second content presentation devices for receiving a first input signal from the first content presentation device indicative of a first interesting portion of the plurality of portions of the digital content identified by a first person included within a first social network, and receiving a second input signal from the second content presentation device indicative of a second interesting portion of the plurality of portions of the digital content identified by a second person included within a second social network; a social network analyzer coupled to the first and second content presentation devices and a third content presentation device for determining if a third person operating the third content presentation device is included in either the first social network or the second social network; and a digital content preview generator coupled to the third content presentation device for generating a first digital content preview of the digital content item including the first interesting portion and not the second interesting portion based upon the third person being a member of the first social network, and for generating a second digital content preview of the digital content item including the second interesting portion and not the first interesting portion based upon the third person being a member of the second social network.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present description, in which.

DETAILED DESCRIPTION

Figure 1:
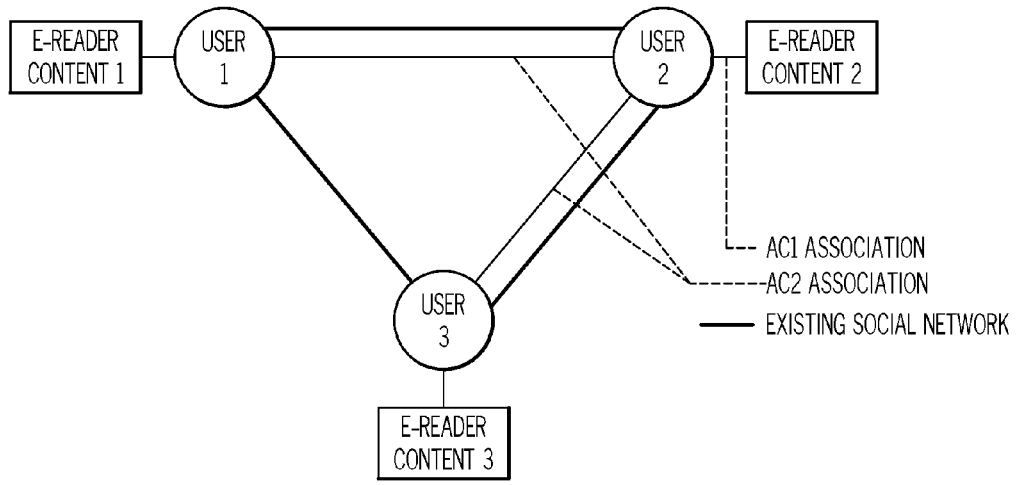
FIG. 1-FIG. 3 show various relationships between nodes or member of a social network for social network analysis and for content preview generation.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present disclosure has been presented for purposes of illustration and description, but is not intended to be exhaustive or limited in the form disclosed. Many modifications and variations will be apparent to those of ordinary skill in the art without departing from the scope of the description. The embodiment was chosen and described in order to best explain the principles of the description and the practical application, and to enable others of ordinary skill in the art to understand the description for various embodiments with various modifications as are suited to the particular use contemplated.

Content presentation devices include e-reading devices and smartphones. Both e-reading devices and smartphones are rapidly growing in popularity. An e-book reader, also called an e-book device or e-reader, is a mobile electronic device that is designed primarily for the purpose of reading digital e-books and periodicals. Any device that can display text on a screen may act as an e-book reader, but specialized e-book reader designs may optimize portability, readability (especially in bright sun) and battery life for this purpose. A single e-book holds the equivalent of many printed texts with no added mass or bulk.

A smartphone is a mobile phone built on a mobile computing platform with more advanced computing ability and connectivity than a feature phone. The first smartphones mainly combined the functions of a personal digital assistant (PDA) and a mobile phone or camera phone. Today's models also serve to combine the functions of portable media players, low-end compact digital cameras, pocket video cameras, and GPS navigation units.

Targeted advertising is a type of advertising whereby advertisements are placed so as to reach consumers based on various traits such as demographics, psychographics, behavioral variables (such as product purchase history), and firmographic variables . . . or other second-order activities which serve as a proxy for these consumer traits. Most targeted new media advertising currently uses second-order proxies for targeting, such as tracking online or mobile web activities of consumers, associating historical webpage consumer demographics with new consumer web page access, using a search word as the basis for implied interest, or contextual advertising."

With the "Search Inside" feature of some on-line booksellers, potential book buyers may see "sample pages" or portions and links to different sections of the book, such as the Front and Back Cover, Index, Table of Contents, and an Excerpt. Users can sample or preview e-books. In one example, users can download a sample of every e-book (usually first one or two chapters) by pressing "sample" button on a web page previewing the e-book. However, lookup, highlights and annotations don't work. When reading on an e-book reader, designated highlights of interesting portions are sent to a private page. Further, highlights of all e-book customers and identify the passages with the most highlights may be stored as Popular Highlights. The resulting Popular Highlights help readers to focus on passages that are meaningful to the greatest number of people.

A user's social network is analyzed to proactively and selectively download portion of books or other documents to an e-reader device and selectively display a preview of specific portions of books or journal articles at a web page for buying or otherwise acquiring such content. Because a significant number of users in a social network (including clusters of individuals in a company) have shared interests or jobs, a user is likely to be exposed to useful segments of content and then potentially make a purchase of the full content (e.g. a book or article).

FIG. 1 shows an example of users in a social network. An analysis component (AC1) analyzes user's books (or articles) on an e-reading device (e.g. AC1 scans e-reader for books recently read, partially read, specific pages read, time spent on pages, highlights made in books or articles, etc.). Then, analysis component 2 (AC2) analyzes user's social network for other books (or articles) read (in part or in their entirety) by members of that network (e.g. a social network comprising email/twitter contacts and the friends of email friends and clusters of company thought leaders). If math-function-of (AC1 results, AC2 results, n)>threshold, then proactively download portion of books (or articles) discovered by AC2. (n may be the number of users in the social network, and/or it can reflect how much of a book was read, book reviews, distance in a social network, and other parameters). If math-function-of (AC1 results, AC2 results, n)>threshold, then display specific pages discovered by AC2 at a "Search Inside" or "Preview" feature of a text-content seller's web site. (n may be the number of users in the social network, and/or it can reflect how much of a book was read, book reviews, distance in a social network, and other parameters).

The system uses AC1 to form associations between a user of the system and the books on the user's e-reader device, their content, categories, or other descriptors. In addition, AC1 may analyze the user and the books on the user's device in order to categorize the user. AC2 forms associations between these categories of user/e-reader content with members of the user's social network and their e-reader content. In this way, a social network may be represented as a set of relationships between users of the system, with weights between nodes of this network representing a relationship between users of e-readers and their e-readers' content.

FIG. 1 shows a representation of the relationships and the associations formed by AC1 and AC2. Note that User 1 and User 3 and their e-readers' content are categorized differently by on AC1. User 2 shares characteristics of each category (represented by the AC1 association line). AC2 recognizes these relationships by analyzing the existing social network and finding nodes that share characteristics based on users and their e-readers' content. For this reason, AC2 does not assign a connection between User 1 and User 3, despite their being linked in the existing social network.

The system may learn in the following manner. If a book or article is proactively downloaded and then actually read, the associations of users and content made by AC1 and AC2 are strengthened relative to the book or article that is proactively downloaded and not read. Thus, in future iterations of the proactive download system, these "attractive" books or articles may receive heavier weighting because they are more likely to be of value. Note that a user's (or owner's) engagement with a book or article (and/or the degree to which a book/article is "read") can be estimated by many methods including: the amount of highlighting a user has performed in an e-book, the number of pages turned, the number of times an item is printed, the number of annotations made, the amount of scrolling or "zooming" on a page, etc.). Also note that a user may sometimes wish to avoid books that his or her social network has little interest in. For example, a user may wish to avoid books or articles that no one in his or her social network has downloaded or read. In a similar manner, particular elements of a book, magazine article, journal article, newspaper article, etc. may be displayed in a "Search Inside," "Restricted Preview," or related feature of an on-line seller of books, articles, etc. These elements of a book or paper may include book pages, figures from a technical journal article, equations from a technical journal article, etc.

Figure 2:
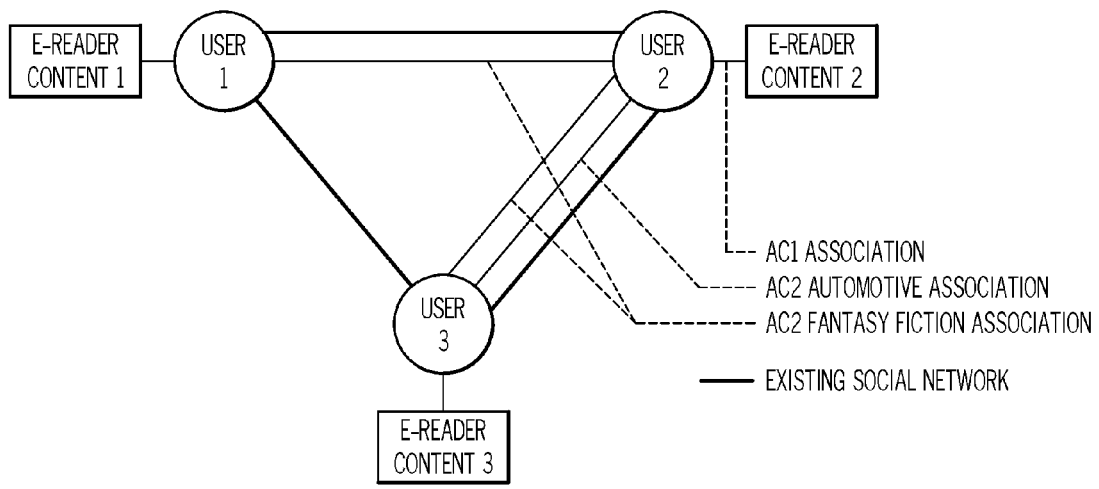

As shown in FIG. 2, association made by AC1 and AC2 may be represented as a second graph or network, which is closely related to the existing social network, wherein strengths of associations between nodes of the graph correspond to the aforementioned associations, which are strengthened when a book or article is appropriately recommended or prospectively downloaded. The second graph allows subsequent recommendations made by the system to depend not only on which members of the user's social network has read a particular book, and on the selectively strengthened weight of association between this member (node) in the network and the user, but also, in addition, relationships to nodes in this second graph may correspond to finer representations of the role the recommending individual plays in recommending books.

For example, an individual in FIG. 2 may be identified by both "Larry-Automotive Repair" and "Larry-Fantasy Fiction" relationships. These correspond to a user's friend Larry's relatedness to the user's interests in 1) automotive repair books and 2) fantasy fiction books. In this way, Larry's skill in selecting useful automotive repair manuals may be exploited by strengthening the weight of this link to the user, while his somewhat different and less useful taste in fantasy fiction can be represented by a decreased weight of connection. This is represented in the modified graph of FIG. 2.

In one example, Joe is browsing to a page at an online or journal seller such as a professional society's web site. Joe wishes to preview certain elements of the online content. In this example, preview pages, figures, equations, or other elements may be revealed as determined by AC1 and AC2. In this manner, Joe is likely to receive an interesting, popular, and/or useful segment of the content, which may also encourage Joe to purchase or otherwise acquire the online content.

In another example, if a user is a graphic designer working at a company, it is likely that he or she has other graphic designers or other like-minded people in his or her social network who may have read certain technical books or articles. Social networks include those formed through standard company tools such as a company's listing of departments and groups or through general social media networks such as Facebook, Twitter, Myspace, along with gaming sites, virtual universe sites, etc. Also, email and instant message contact lists, a record of emailing and messaging, etc, may be mined for social network information.

As another example, Sue is browsing an on-line page related to a technical journal paper published by a technical society. Perhaps the paper is important to her for her technical work at her company. She wishes to get a better idea about the paper before making a purchase. The seller of papers reveals, for example, page 3, equation 2, Figure 3, and code snippet 2 to be interesting portions—because AC1 and AC2 have determined that these are popular items in Sue's social network and/or highlighted by any of members of her: social network, company, department in a company, etc. In this manner, Sue is likely to receive an interesting segment of the content, which may also encourage her to purchase the online content to help her at her job. Sue may also specify specific members or classes of members of her social network or company network. For example, perhaps she may follow a set of distinguished engineers or managers who contribute to AC2. In addition, the inventive system may discover by means of learning that Sue values a colleague's recommendation for software design manuals, since she always reads recommendations derived from this association, but she does not value the colleagues recommendations in travel magazines. The AC2 system therefore creates two relationships in the second graph corresponding to this colleague's roles, "Colleague1-software" and "Colleague1-travel" and applies weights to these associations accordingly.

As yet another example, Sam is considering subscribing to a certain newspaper but is hesitating because of the expense, or because he is not sure if the newspaper interests him. The newspaper, with Sam's permission, may display a customized version based on the articles read by Sam's social network in order to provide an incentive for him to subscribe. Members of his social network may share some of Sam's interests. The newspaper could optionally offer this customized version to Sam as his subscription for a price that is different from the standard subscription price.

Potential benefits of the system may be realized by readers because they are exposed to potentially interesting new books and articles and vendors/stores because their devices and services will be "sticky" (i.e. be more attractive than devices and services without this feature). Authors and publishers benefit because more readers are exposed to their content. Other potential benefits include: proactive downloading of portions of books/articles, analysis of degree to which a book/article is read, specific pages read, highlights made in books, time spent on pages, etc. Another potential benefit allows for the growing popularity of e-readers and smart-phones, and the scanning of books/articles residing on an e-reader device, etc. while emphasizing the exposure of potential buyers to useful "previews" and segments at a web site used for selling books, journal papers, etc.—where the precise nature of the preview segment is determined by an analysis of a user's social network.

Additionally, the AC2 may consider attributions that may be mined and used with respect to Degree Centrality, Betweenness Centrality, Closeness, Eigenvalue Hub, and Authority. As an example, an "Authority" generally has a high number of relationships "pointing to it" and acts as a knowledge source of information. A Hub is an individual that points to a relatively large number of Authorities. These characterizations of the social network can be made known using known network-analysis tools. In enterprise business scenarios, employee subject matter experts (SMEs) may also be explicitly identified by individuals (e.g. experts, managers, IT staff, etc) to act in one or more Centrality Roles to support more effective analysis in this description.

Social network analysis may then allow targeted advertising and marketing to proceed in a new way. Since individuals often recommend books to one another in private, the analyses described here is possible, which may make recommendations before an exchange (e.g. an informal verbal exchange) takes place between users of the system. In other words, since individuals often recommend books to one another informally, for example through spoken conversation, the market analyses externalizes these recommendations and in order to generate them before an informal exchange takes place between users of the system. Therefore, the notion that the secondary graph described to represent reader recommendation relationships is in fact a directed graph. "Source" nodes, i.e., individuals who are more likely to find new things to read, independent of recommendations of others, may be identified through network analysis. Since these peoples introduce new books and material into the network, their role as "hubs" may be exploited by targeted advertising and other information related to new releases and publications, possibly allowing promotional copies of certain books to be provided to such hub individuals automatically. In this way, the system can target marketing material differently to these "hub/source nodes" than to other nodes in the graph which are more likely to make consumer decisions about books based on the recommendations of others.

The system described herein may also be used to "filter" presentations of books and articles, for example, presentations at a book-selling or article-selling website. For example, based on the results of AC1 and AC2, when a user is browsing books at a bookseller's website, the user may only see those books that are read or downloaded by others in their social network. This represents a customized view based on AC1 and AC2. Similarly, AC1 and AC2 may be used to change the ordering of books or articles presented at a website. For example, those books downloaded the most often by members of a social network may appear before those that are seldom downloaded.

A trigger based on a threshold may depend on the detection of a trend within a social network, within a company, within a department of a company, etc. Once a trend is detected among multiple users or consumers, the system may be triggered. Bellwethers or various kinds of leaders may be used to enhance trend prediction. When a behavior develops among a large population, and then is followed with enthusiasm for some period T, this may also be used as a trigger. Trend estimation (a statistical method) can be used to construct a model, for example, to determine if buying patterns (or download or reading patterns) exhibit an increasing or decreasing trend that is statistically distinguished from random behavior. These trends may be restricted to given locations.

Figure 3:
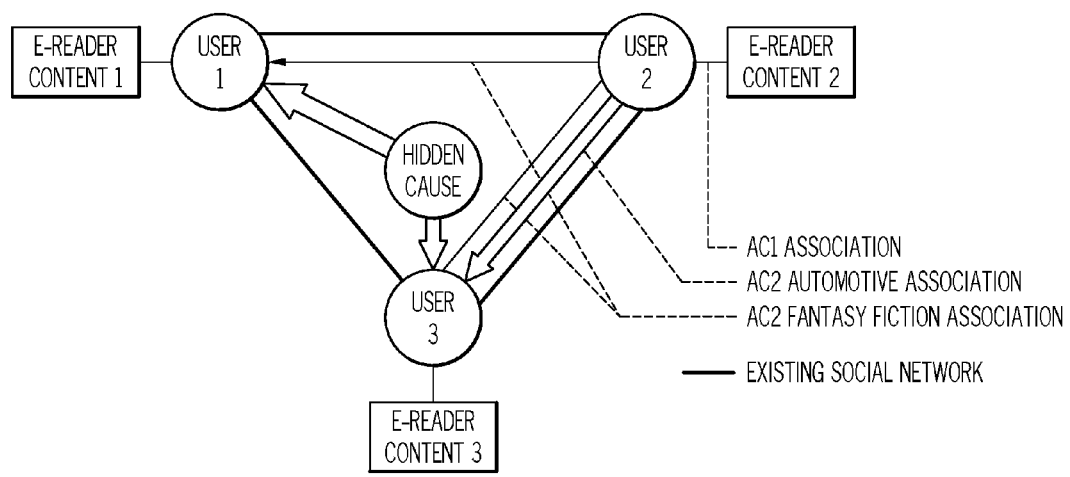

An example of how trends and triggers may depend on temporal dynamics includes the analysis of downloading and reading of e-reader book in time. In this way, AC2 may not only correlate nodes in a network and their relationships to a user in order to make recommendations for e-reader downloads, but may also correlate the behavior of these nodes (social network/recommender roles) in time, such that if many recommender relationships to the user download and read the same book simultaneously, the recommendation and download of the same e-book is much faster than if these same recommender nodes download and read the same book sequentially. This may prove especially useful in the event that the simultaneity in these behaviors is due to a secondary, hidden cause, such as an event in the workplace, a new release of a competitor's product, etc., which is not represented in the existing secondary graph. This secondary cause is represented in FIG. 3.

Note that this system has application beyond magazines, newspapers, books, and related documents and subscriptions. For example, the approach may be used to show previews of complex virtual worlds and games. Also, it may also be used to actually create a subset of a virtual world or game that is likely to interest the user. The approach may also be used for creating custom movie or TV show previews based on social networks, instead of the more traditional "movie trailers."

For example, an analysis component (AC1) analyzes a user's watched movies, TV shows, educational content, documentaries, instructional videos, etc. (e.g. AC1 scans a multimedia device or service provider system for movies recently watched, partially watched, specific scenes voted on, time spent replaying certain scenes, highlights made on scenes, etc.). Analysis component 2 (AC2) analyzes user's social network for other movies or broadcasts watched (in part or in their entirety) (e.g. a social network comprising email/twitter contacts and the friends of email friends and clusters of company thought leaders). If math-function-of (AC1 results, AC2 results, n)>threshold, then proactively download movies (or broadcasts) discovered by AC2. (n may be the number of users in the social network, and/or it can reflect how much of a movie was seen, movie reviews, distance in a social network, and other parameters). If math-function-of (AC1 results, AC2 results, n)>threshold, then generate a preview including scenes and segments discovered by AC2 on a movie trailer or other form of "Preview" feature at a movie rental web site, commercial presentation, etc.

In a virtual world or game setting, the virtual world may consist of numerous islands, buildings, lands, etc. However, only a subset of this territory will be of high interest to a potential user or player. Some territory will likely be of more interest if a user's social network has made use of or suggested such territories. For example, an analysis component (AC1) analyzes a user's traversal in a virtual world or game, etc. (e.g. AC1 scans a virtual world or game service provider system for territories/buildings recently traversed, partially traversed, specific scenes/buildings/territories voted on, time spent in territories and buildings, votes made with respect to scenes/buildings/territories, etc.). Analysis component 2 (AC2) analyzes user's social network for other virtual world or game territories traversed (in part or in their entirety) (e.g. a social network comprising email/twitter contacts and the friends of email friends and clusters of company thought leaders). The social network may also include players or avatars encountered before in the past while in a virtual world or game. If math-function-of (AC1 results, AC2 results, n)>threshold, then generate a preview including a portion of a 3-D landscape, building, or territory discovered by AC2. (n may be the number of users in the social network, and/or it can reflect how much of a movie was seen, movie reviews, distance in a social network, and other parameters). If math-function-of (AC1 results, AC2 results, n)>threshold, then generate a preview including specific scenes, buildings, and territories discovered by AC2 on a promotional trailer or other form of "Preview" feature at a virtual world or game site.

In one example, a system comprises a first analysis component (AC1) that analyzes a user's use and ownership of books and articles, a second analysis component 2 (AC2) that analyzes a user's social network for other books (or articles) read (in part or in their entirety), a third analysis component (AC3) that analyzes results from AC1 and AC2—based on trigger from AC3, a preview generator that generates a preview having a portion of other books/articles discovered by AC2, based on trigger from AC3, then display specific pages (or elements on a page) discovered by AC2 at a "Search Inside" or "Preview" feature of a text-content seller's web site. The analysis of a user's text content restricted to any of recently used/read, recently downloaded, recently evaluated by the user and frequency of content use>N occurrences per unit time. The text content used by individuals in the user's social network are restricted to any of: recently used/read, recently downloaded, recently evaluated by the user; frequency of content use>N occurrences per unit time; an analysis based on any of Degree Centrality, Betweenness Centrality, Closeness, Eigenvalue Hub, and Authority; and physical location of readers (e.g. readers who are geographically close within a company may be able to provide hands-on help or advice). The AC3 analysis includes the number of users (e.g. readers) in a social network who have used/read a text content (e.g. book) with frequency>f. An icon that represents a book or paper indicates the degree to which the book or paper has certain usage or social-network attributes (e.g. using color, font for title, size, shape, etc.). The icon may appear on web sites of content sellers, and the icon and site may be customized for individual users. The content may include virtual worlds (landscapes, buildings etc.). AC2 and AC3 may provide for a second graph, wherein nodes in a social network representing individuals may connected by multiple relationships representing the individual's one or more roles in recommending books to the user.

What is described includes a system in which a distributor of content (e.g. magazine, technical journal, or book content) can provide a more useful "Search Inside" (e.g. "partial preview") for such content at the point-of-sale Web page, and this preview is more likely to be of value to potential buyers than approaches that may, for example, only show a paper Abstract or a textbook first chapter. More particularly, an analysis is performed of a user's social network to determine useful preview content, such as a paragraph, figure, formula, chapter, piece of code, etc. Because a significant number of users in a social network (including clusters of individuals in a company) have shared interests or jobs, in this manner, a user is likely to be exposed to useful segments of content and then potentially make a purchase of the full content (e.g. a book or article). A graph is also described that can be used to determine more nuanced previews of content, wherein relationships to nodes (people) in a graph may correspond to finer representations of people "roles" when recommending sections for partial preview and for books. For example, an individual in the graph representation may be identified by "Larry-Automotive Repair," and "Larry-Fantasy Fiction." relationships.

The terminology used herein is for the purpose of describing particular embodiments only and is not intended to be limiting of the description. As used herein, the singular forms "a", "an" and "the" are intended to include the plural forms as well, unless the context clearly indicates otherwise.

The terms "comprises" and/or "comprising," specify the presence of stated features, steps, operations, elements, and/or components, but do not preclude the presence or addition of one or more other features, integers, steps, operations, elements, components, and/or groups thereof.

The term "digital content item" includes an electronically stored volume such as a book, article, movie, television show, game, and virtual world, and may include text information having passages, multimedia information such as video and/or audio information having multimedia portions such as scenes, and interactive content having interactive portions which may be selected in response to inputs received during presentations of prior portions of interactive content, such as inputs received while playing a video game or presenting a virtual world.

The term "plurality of portions" of the digital content indicates that the digital content may be comprised of multiple segments. For example, text information has passages including chapters, paragraphs, sentences, phrases, and formulas, multimedia information may have multimedia portions including scenes, interactive content may have interactive portions including virtual world locations or video game sequences.

The term "interesting portion" indicates one of the plurality of portions that has been identified by a person who has acquired the digital content item. A text based interesting portion may be a passage that is highlight or bookmarked, have interlineations, or time may have been spent reading the passage. A multimedia interesting portion or an interactive interesting portion may be replayed, voted upon or highlighted.

The term "content presentation device" indicates an electronic device that presents a digital content item to a person. A content presentation device may include an e-reader, e-book, cellphone, tablet, personal computer, gaming device or other device for presentation of a digital content item.

The term "digital content server" indicates a system for distributing, purchasing, renting, and/or previewing digital content items. A digital content server may be included within digital content distributions systems that allow for presentation of text, multimedia and/or interactive content on content presentation devices.

The term "social network" indicates a network where a person has associations or relationships with other persons. The social network perspective provides a set of methods for analyzing the structure of whole social entities as well as a variety of theories explaining the patterns observed in these structures, and may include social networking services such as Facebook, Twitter, LinkedIn Google+, and My Space.

The term "relationship magnitude" indicates a closeness of association between members of a social network. Relationship magnitude may be determined using social network analysis metrics such as degree centrality, betweenness centrality, closeness, Eigenvalue hub and authority, a family relationship, an employment relationship, a social media relationship status, and an interest in a topic related to the first content item.

The term "role magnitude" indicates a status of a member of a social network. Role magnitude may be determined determining the expertise of a social network member by determining the number of digital content items having interesting portions identified by the member within the subject matter of the digital content item. Also role magnitude may indicate a hierarchical status of the member within an organization related to social network. Such a hierarchical status includes employer/employee, doctor/patient, parent/child.

Figure 4:
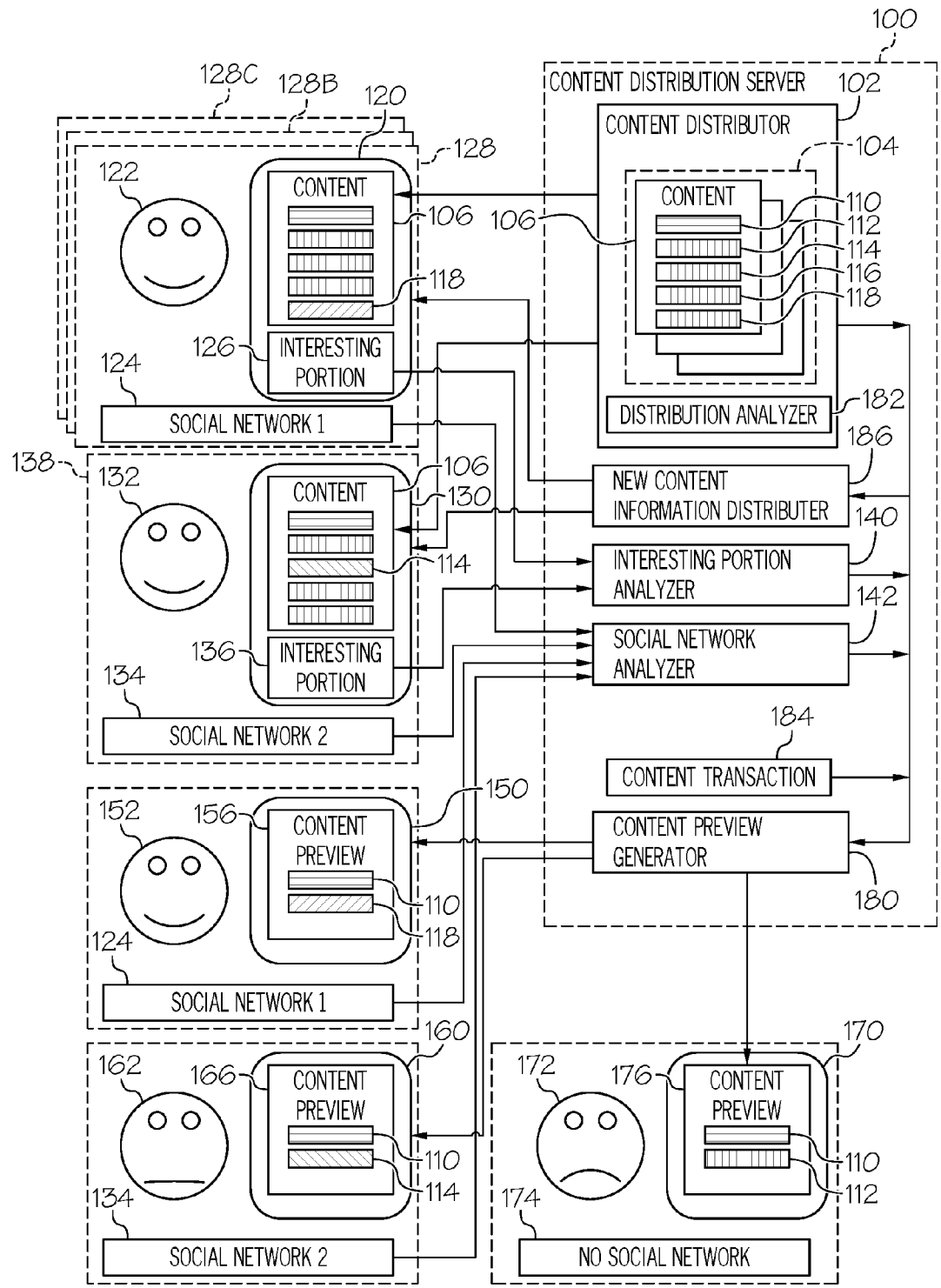
FIG. 4 shows a block diagram of a content distribution system for generating a content preview using social network analysis.

FIG. 4 shows a block diagram of a content distribution system for generating a content preview using social network analysis. Content distribution server 100 includes a content distributor 102 having a digital memory 104 for storing digital content items including digital content item 106 having a plurality of portions 110-118. In one example, if digital content item 106 comprises text portions such as an e-book, then plurality of portions 110-118 could correspond to paragraphs or other sections, portion 110 could include the title, author and abstract while portions 112-118 corresponding to paragraphs of the body of the e-book.

The content distributor 102 distributes the digital content item 106 to a first content presentation device 120 operated by a first person 122 belonging to a first social network 124. Content portion 118 has been identified as a first interesting portion by the first person using the content presentation device 120, and in response, interesting portion identification process 126 generates a first input signal indicative of the first interesting portion 118.

The content distributor 102 also distributes the digital content item 106 to a second content presentation device 130 operated by a second person 132 belonging to a second social network 134. Content portion 114 has been identified as a second interesting portion by the second person using the content presentation device 130, and in response, interesting portion identification process 136 generates a second input signal indicative of the second interesting portion 114.

The first content presentation device 120 and the first person 122 may act as a node 128 on the first social network 124. In other examples, the first social network may include additional nodes 128B-128C, each additional node having digital content item 106 and a person able to identify interesting portions wherein an interesting portion process generates additional input signals indicative of the identified interesting portion. In other examples, other similar additional nodes may be added to node 138 and included in the second social network. In yet other examples there may be more than two social networks.

Interesting portion analyzer 140 is coupled to the first and second content presentation devices 120, 130 and receives the first and second input signals from interesting portion processes 126 and 136.

Social network analyzer 140 is also coupled to the first and second content presentation devices 120, 130 as well as a third content presentation device 150 operated by a third person 152 included within the first social network 124, and a fourth content presentation device 160 operated by a fourth person 162 included within the second social network 134, and a fifth content presentation device 170 operated by a fifth person 172 which is not a member of either the first or second social networks 174. Social network analyzer determines which content presentation devices are operated by various persons within social networks. For example social network analyzer determines that content presentation devices 120 and 150 are operated by persons included within first social network 124, content presentation devices 130 and 160 are operated by persons included within the second social network 134, and content presentation device 170 is operated by a person not included in either the first or second social network.

Content previews 156, 166 and 176 are to be generated for the first digital content item 106 on content presentation devices 150, 160 and 170 for persons 152, 162 and 172 by content preview generator 180. All content previews 156, 166 and 176 are shown having a common portion 110 which may correspond to a title, abstract or other descriptive portion of the content. However, the remaining portions of the content preview include portions that may be based upon upon the social network of the person operating the content presentation device. For any of a number of reasons, persons 152, 162 and 172 may be previewing the first digital content item 106, and after the preview may decide to acquire access to the first digital content item. Content distribution server 100 provides for the generation of three different previews 156, 166 and 176 by content preview generator 180 based upon the social network status of persons 152, 162, and 172 as determined by social network analyzer 140. In this example, person 152 and 122 are members of the first social network 124 and person 122 has indicated that portion 118 is an interesting portion, consequently content preview generator includes portion 118 in preview 156 for person 152. Similarly, person 162 and person 132 are members of the second social network 134 and person 132 has indicated that portion 114 is an interesting portion, consequently content preview generator includes portion 114 in preview 166 for person 162. However, person 172 is not a member of either the first social network 124 or the second social network 134, consequently content preview generator includes portion 112 in preview 176 for person 172. Portion 112 may be the first paragraph after abstract 110, or may be a portion selected for preview by the author or publisher or other person where the social network status of the person viewing the preview is not taken into account.

Note further that preview 156 does not necessarily include portion 114 and preview 166 does not necessarily include portion 118 because persons 152 and 162 are in different social networks. Also, preview 176 does not necessarily include either portions 114 or 118 because person 172 is not included in either the first or second social network.

In an example where another person included within a node of the first social network identifies an interesting portion different from portion 118, social network analyzer may further analyze a relationship magnitude between the members of social network 1 and generate a preview accordingly. For example, if person 112 had a greater relationship magnitude with the previewer than the person of node 128B, then portion 118 would be selected for preview rather than the interesting portion identified by the person of node 128B. Relationship magnitude may be determined using social network analysis metrics such as degree centrality, betweenness centrality, closeness, Eigenvalue hub and authority, a family relationship, an employment relationship, a social media relationship status, and an interest in a topic related to the first content item.

In an example where another person included within a node of the first social network identifies an interesting portion different from portion 118, social network analyzer may further analyze a role magnitude between the members of social network 1 and generate a preview accordingly. For example, if person 112 had a greater role magnitude than the person of node 128B, then portion 118 would be selected for preview rather than the interesting portion identified by the person of node 128B. Role magnitude may be determined based upon the expertise or hierarchical status. For example, if the person of node 120 was the supervisor of person 162, while the person of node 120B was a contemporary of person 162, then portion 118 would be selected because of the greater role magnitude of the person of node 120. In another example, if the person of node 120 had reviewed more digital content items within the subject area of digital content item 106 and identified more corresponding interesting portions than the person of node 120B, as determined by distribution analyzer process 182, then portion 118 would be selected because of the greater role magnitude of the person of node 120.

If a person decides to acquire the digital content item, including the plurality of portions, an acquisition signal is received and a content transaction is managed by content transaction process 184. The acquisition may take the form of no-compensation download, an advertised subsidized presentation, a limited term rental, a purchase or other type of transaction used to acquire content. The acquired content may be presented on any device operated by the acquiring person including the content presentation device receiving the preview.

A person identifying interesting portions of acquired content may be further provided additional information related to new content by new content information distributor 186. The new content may be included in a subject area associated with content for which interesting portions have been identified by the person. In this way, the person may provide further identification of interesting portions of new content to help further facilitate the acquisition of the new content by previews generated for members of the social network of the person. The new content information may further be conditioned upon the person identifying interesting content of a digital content item that was used in a preview that resulted in an acquisition of the digital content item by the person viewing the preview.

FIG. 4 shows a system for enabling a process for identifying a first interesting portion 118 of a digital content item 106 having a plurality of portions 110-118, the first interesting portion identified based upon a first input signal by process 126 received at a first content presentation device 120, the first content presentation device operated by a first person 122 associated with a first social network 124. The process further for identifying a second interesting portion 114 of the digital content item 106, the second interesting portion identified based upon a second input signal by process 136 received at a second content presentation device 130, the second content presentation device operated by a second person 132 associated with a second social network 134. It is then determined that a third person 152 operating a third content presentation device 150 is associated with the first social network 124 and a fourth person 162 operating a fourth content presentation device 160 is associated with the second social network 134. In response the process generates a first digital content preview 156 of the digital content item for presentation on the third content presentation device, the first digital content preview including the first interesting portion 118 based upon the third person being associated with the first social network, a second digital content preview 166 of the digital content item for presentation on the fourth content presentation device, the second digital content preview including the second interesting portion 114 based upon the fourth person being associated with the second social network.

The process further allows for enabling presentation of the first digital content preview by the third content presentation device. The content transaction process 184 allows for receiving an acquisition signal associated with the presentation of the first digital content preview and enabling presentation of the plurality of portions of the digital content item by a content presentation device operated by the third person based upon the compensation signal. New content information distributor 186 allows for communicating information related to a second digital content item to the first person based upon the acquisition signal.

The digital content item may include text information having a plurality of passages corresponding to the plurality of portions and the first interesting portion may correspond to at least a first of the plurality of passages and the first input signal may be based upon a first annotation to the text information received from the first person at the first content presentation device. The first annotation may include at least one of text highlights, interlineations and bookmarks. In another example, the first input signal is based upon an amount of time spent reading the first of the plurality of passages by the first person at the first presentation device.

In another example, the digital content item includes multimedia information having a plurality of multimedia portions corresponding to the plurality of portions and the first interesting portion corresponds to at least a first of the plurality of multimedia portions and the first input signal is based upon at least one of replaying, voting and highlight made on the first of the plurality of multimedia portions by the first person at the first presentation device.

In another example, the digital content item includes a plurality of interactive portions corresponding to the plurality of portions, wherein presentation of a subsequent interactive portion is based upon inputs received during presentation of a prior interactive portion and the first interesting portion corresponds to at least a first of the plurality of interactive portions and the first input signal is based upon at least one of replaying, voting and highlight made on the first of the plurality of interactive portions by the first person at the first presentation device.

Figure 5:
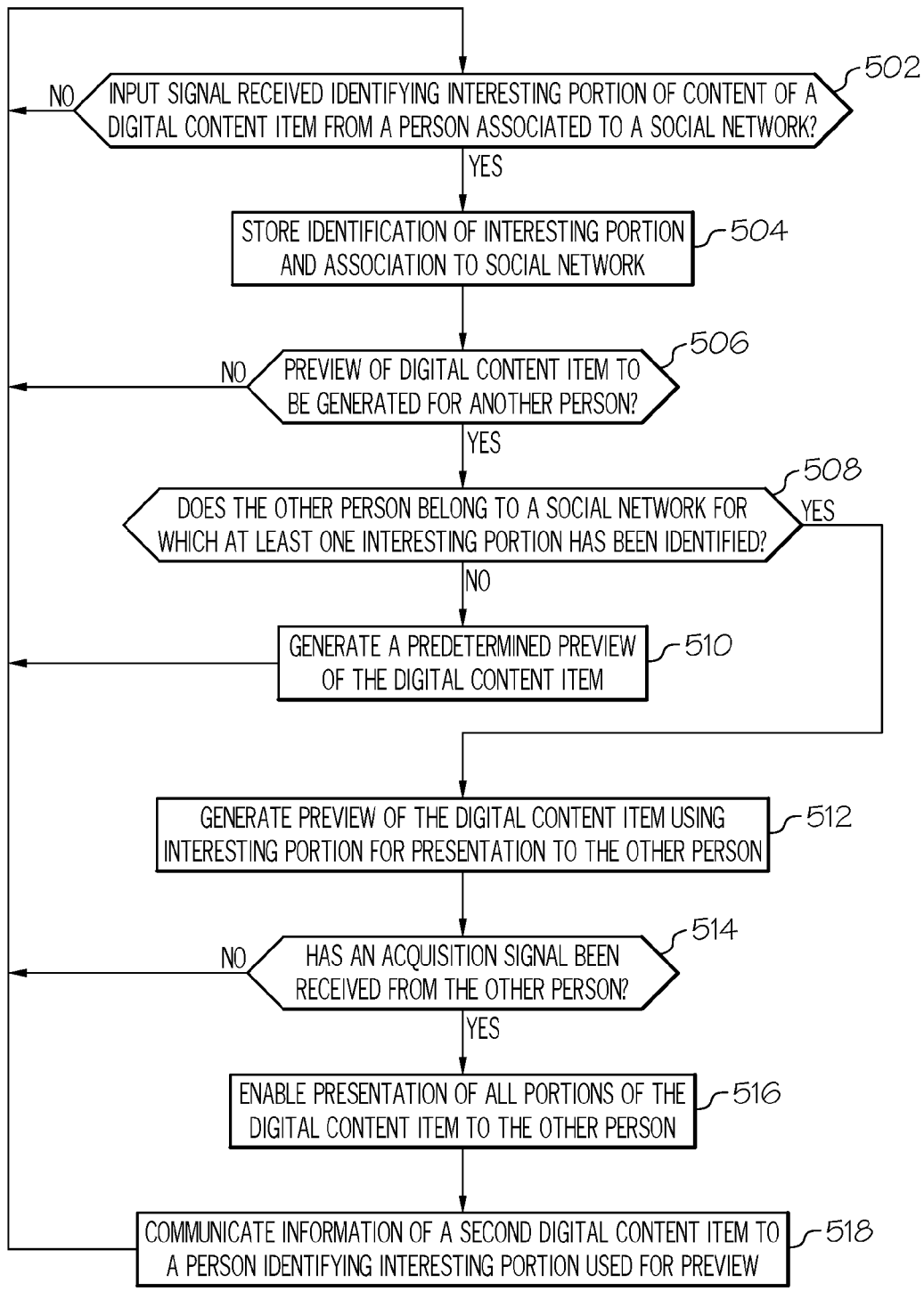
FIG. 5 shows an example flow diagram of a process for generating a content preview using social network analysis.

FIG. 5 shows an example flow diagram of a process for generating a content item preview using social network analysis. Step 502 determines if an input signal is received that identifies an interesting portion of content of a digital content item from a person associated with a social network. If so, step 504 stores identification of the interesting portion and associated social network. Additional information may also be stored to allow for determination of the relationship magnitude and the role magnitude. Step 506 determines if a preview of the digital content item is to be generated for another person. The preview may be generated in response to any of a multiplicity of processes used to recommend a preview to a person. If a preview is to be generated, step 508 determines if the other person belongs to a social network for which at least one interesting portion has been identified. If not, step 510 generates a predetermined preview of the digital content item, as shown in preview 176 of FIG. 4. If the other person does belong to a social network having an identified interesting portion, then step 512 generates a preview of the digital content using the interesting portion for presentation to the other person as shown in preview 156 or 166 of FIG. 4. Then, step 514 determines if an acquisition signal has been received from the other person in response to the preview. If so, step 516 enables presentation of all portions of the digital content item to the other person and step 518 communicates information of a second digital content item to a person identifying the interesting portion used for the preview.

Figure 6:
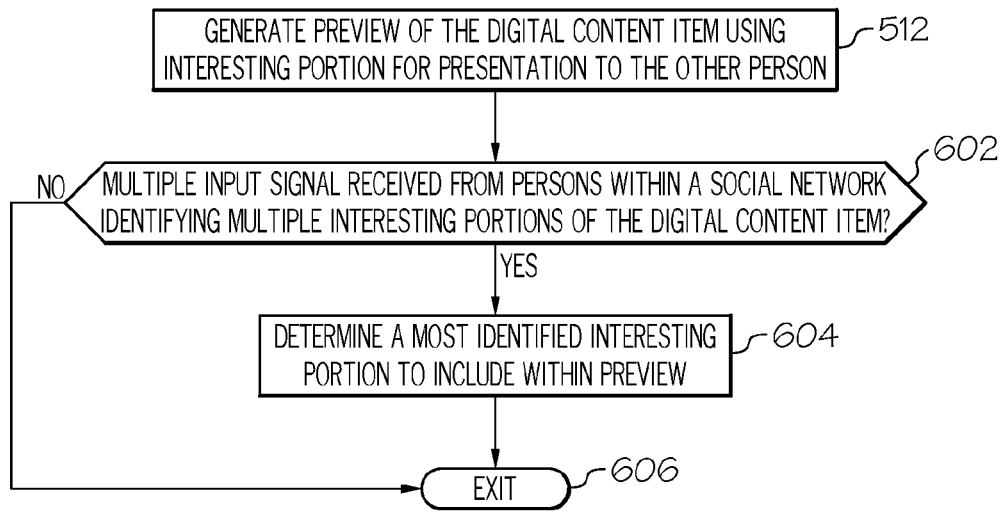
FIG. 6 shows an example flow diagram for a process for generating a content preview based upon a more identified interesting portion within a social network.

FIG. 6 shows an example flow diagram for a process for generating a preview based upon a more identified interesting portion within a social network. The process begins at step 512. If multiple input signals are received from persons within a social network that identify multiple interesting portions of the digital content item at step 602, then step 604 identifies a more identified interesting portion to include within a preview. The more identified portion may correspond to a most identified portion, or a highly identified portion combined with other factors such as relationship magnitude and/or role magnitude for selecting between other highly identified portions. In one example, to be included within a preview a portion must also be identified by a minimum number of persons within the social network. The minimum number may be two. FIG. 6 provides for the first interesting portion to be based upon a first plurality of input signals, the first plurality of input signals including the first input signal, identifying the first interesting portion, and received at a first plurality of content presentation devices including the first content presentation device, the first plurality of content presentation devices operated by a first plurality of persons including the first person, the first plurality of persons associated with the first social network. The first plurality of input signals are included within a first multiplicity of input signals identifying a first multiplicity of interesting portions including the first interesting portion, the first plurality of content presentation devices are included with a first multiplicity of content presentation devices, the first plurality of persons are included with a first multiplicity of persons operating the first multiplicity of content presentation devices, the first multiplicity of persons being associated with the first social network, and the identifying the first interesting portion further includes determining the first plurality of input signals to indicate that the first interesting portion is a more identified portion of the first multiplicity of interesting portions identified by the first multiplicity of input signals.

Figure 7:
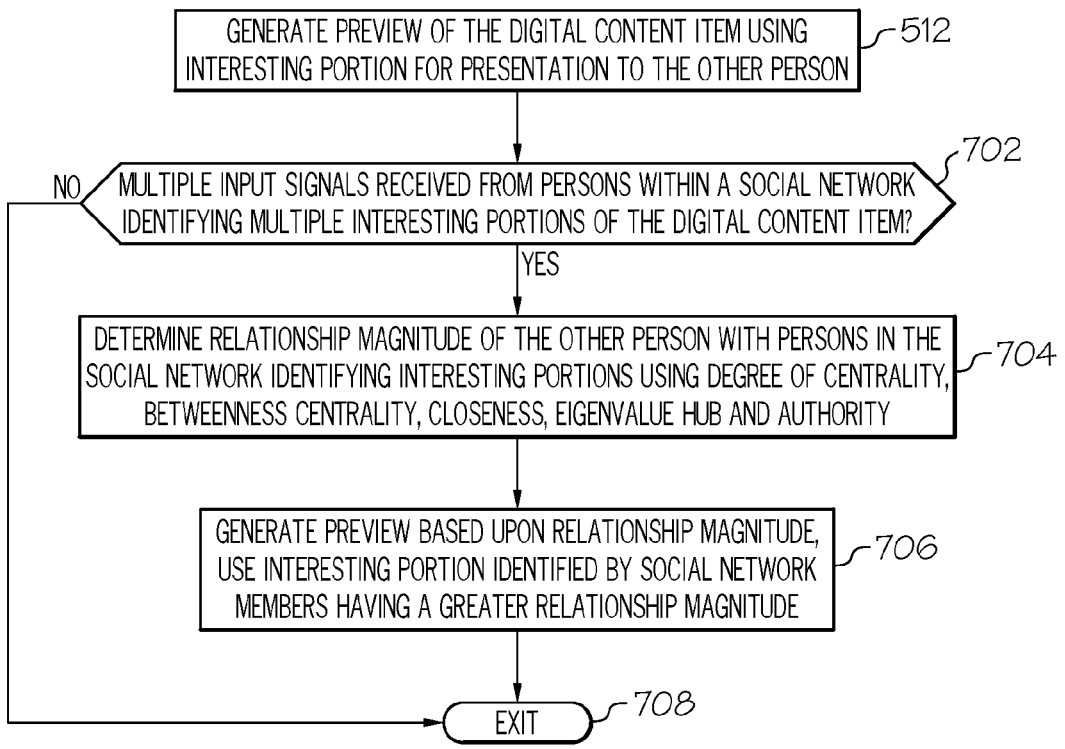
FIG. 7 shows an example flow diagram for a process for generating a content preview based upon a relationship magnitude within a social network.

FIG. 7 shows an example flow diagram for a process for generating a preview based upon a relationship magnitude within a social network. The process begins at step 512. If multiple input signals are received form persons within a social network that identify multiple interesting portions of the digital content item at step 702, then step 704 determines a relationship magnitude between the persons identifying interesting portions and the person for which the preview is generated and step 706 generates the preview based upon the relationship magnitude, using the interesting portion identified by social network members having a greater relationship magnitude. Determining the relationship magnitude may include evaluating at least one of a degree centrality, betweenness centrality, closeness, Eigenvalue hub and authority, a family relationship, an employment relationship, a social media relationship status, and an interest in a topic related to the digital content item.

Figure 8:
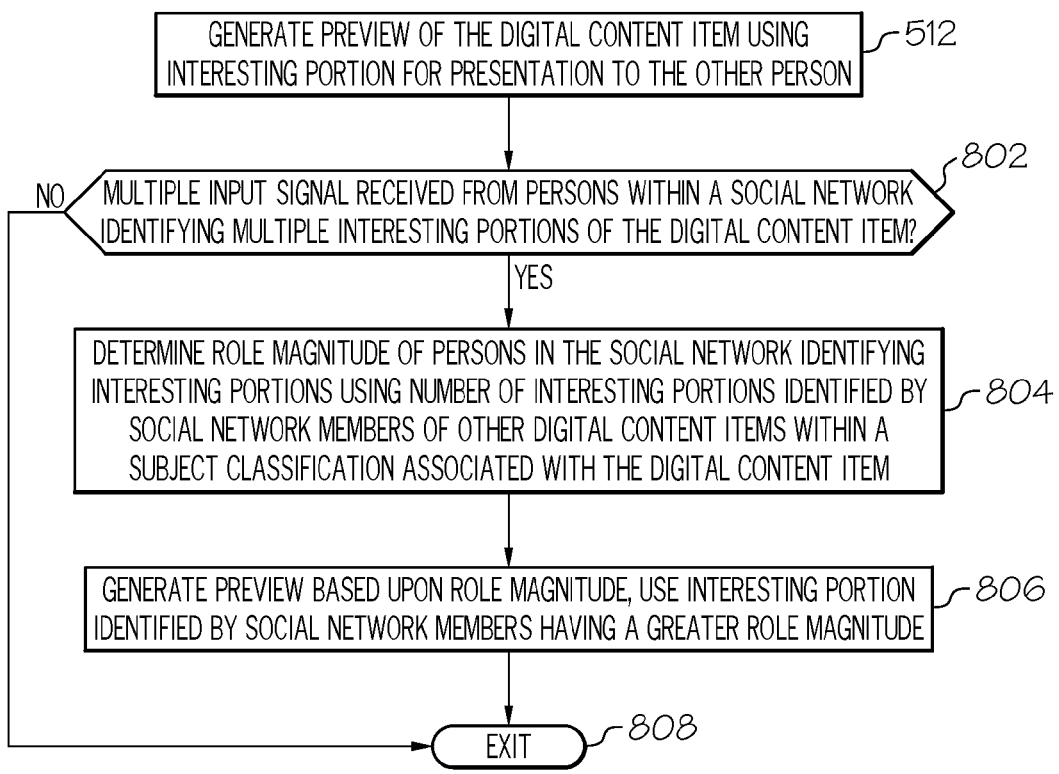
FIG. 8 shows an example flow diagram for a process for generating a content preview based upon a role magnitude within a social network.

FIG. 8 shows an example flow diagram for a process for generating a preview based upon a role magnitude within a social network. The process begins at step 512. If multiple input signals are received from persons within a social network that identify multiple interesting portions of the digital content item at step 802, then step 804 determines a role magnitude between the persons identifying interesting portions and the person for which the preview is generated and step 806 generates the preview based upon the role magnitude, using the interesting portion identified by social network members having a greater role magnitude.

Approaches for selecting an interesting portion for a preview for person from a multiplicity of identified interesting portions identified by members of a social network are shown in FIG. 6-FIG. 8. It should be appreciated that any combination of "more identified", "relationship magnitude", and "role magnitude" selection criterion may be utilized in the selection of an interesting portion for preview while remaining within the scope of this description. For example, if two interesting portions are similarly "more identified" and the subject matter deals with entertainment, then "relationship magnitude" may be utilized to select between the two portions, particularly if the relationships are friend or family relationships. If two interesting passages are similarly "more identified" and the subject matter deals with items of a professional nature, then "role magnitude" may be utilized to select between the two portions, particularly if the relationships are employment relationships.

The present description may be a system, a method, and/or a computer program product. The computer program product may include a computer readable storage medium (or media) having computer readable program instructions thereon for causing a processor to carry out aspects of the present description.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present description may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present description.

Aspects of the present description are described herein with reference to flowchart illustrations and/or block diagrams of methods, apparatus (systems), and computer program products according to embodiments of the description. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present description. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present application has been presented for purposes of illustration and description, but is not intended to be exhaustive or limited to the description in the form disclosed. Many modifications and variations will be apparent to those of ordinary skill in the art without departing from the scope of the description. The example was chosen and described in order to best explain the principles of the description and the practical application, and to enable others of ordinary skill in the art to understand the description for various examples with various modifications as are suited to the particular use contemplated.

What is claimed is:

1. A method operating within a content distribution server comprising:
    identifying a first interesting portion of a digital content item having a plurality of portions, the first interesting portion identified based upon a first input signal received at a first content presentation device, the first content presentation device operated by a first person associated with a first social network;
    determining that a third person operating a third content presentation device is associated with the first social network;
    generating a first digital content preview of the digital content item for presentation on the third content presentation device, the first digital content preview including the first interesting portion based upon the third person being associated with the first social network;
    identifying a second interesting portion of the digital content item, the second interesting portion identified based upon a second input signal received at a second content presentation device, the second content presentation device operated by a second person associated with a second social network;
    determining that a fourth person operating a fourth content presentation device is associated with the second social network; and
    generating a second digital content preview of the digital content item for presentation on the fourth content presentation device, the second digital content preview including the second interesting portion based upon the fourth person being associated with the second social network.

2. The method according to claim 1 further comprising:
    enabling presentation of the first digital content preview by the third content presentation device;
    receiving an acquisition signal associated with the presentation of the first digital content preview; and
    enabling presentation of the plurality of portions of the digital content item by a content presentation device operated by the third person based upon the acquisition signal.

3. The method according to claim 2 further comprising communicating information related to a second digital content item to the first person based upon the acquisition signal.

4. The method according to claim 1 wherein the digital content item includes text information having a plurality of passages corresponding to the plurality of portions and the first interesting portion corresponds to at least a first of the plurality of passages and the first input signal is based upon a first annotation to the text information received from the first person at the first content presentation device.

5. The method according to claim 4 wherein the first annotation includes at least one of text highlights, interlineations and bookmarks.

6. The method according to claim 1 wherein the digital content item includes text information having a plurality of passages corresponding to the plurality of portions and the first interesting portion corresponds to at least a first of the plurality of passages and the first input signal is based upon an amount of time spent reading the first of the plurality of passages by the first person at the first presentation device.

7. The method according to claim 1 wherein the digital content item includes multimedia information having a plurality of multimedia portions corresponding to the plurality of portions and the first interesting portion corresponds to at least a first of the plurality of multimedia portions and the first input signal is based upon at least one of replaying, voting and highlight made on the first of the plurality of multimedia portions by the first person at the first presentation device.

8. The method according to claim 1 wherein the digital content item includes a plurality of interactive portions corresponding to the plurality of portions, wherein presentation of a subsequent interactive portion is based upon inputs received during presentation of a prior interactive portion and the first interesting portion corresponds to at least a first of the plurality of interactive portions and the first input signal is based upon at least one of replaying, voting and highlight made on the first of the plurality of interactive portions by the first person at the first presentation device.

9. The method according to claim 1 wherein
the identifying the first interesting portion identifies the first interesting portion based upon a first plurality of input signals, the first plurality of input signals including the first input signal,
identifying the first interesting portion, and
received at a first plurality of content presentation devices including the first content presentation device, the first plurality of content presentation devices operated by a first plurality of persons including the first person, the first plurality of persons associated with the first social network.

10. The method according to claim 9 wherein
the first plurality of input signals are included within a first multiplicity of input signals identifying a first multiplicity of interesting portions including the first interesting portion, the first plurality of content presentation devices are included with a first multiplicity of content presentation devices,
the first plurality of persons are included with a first multiplicity of persons operating the first multiplicity of content presentation devices, the first multiplicity of persons being associated with the first social network, and
the identifying the first interesting portion further includes determining the first plurality of input signals to indicate that the first interesting portion is a more identified portion of the first multiplicity of interesting portions identified by the first multiplicity of input signals.

11. The method according to claim 10 wherein the identifying does not identify the first interesting portion if the first plurality of input signals identifying the interesting portion is not equal to or greater than two.

12. The method according to claim 1 further comprising:
identifying a third interesting portion of the digital content item, the third interesting portion identified based upon a fifth input signal received at a fifth content presentation device, the fifth content presentation device operated by a fifth person associated with the first social network, wherein,
the determining further determines a first relationship magnitude between the third person and the first person and a second relationship magnitude between the third person and the fifth person, and
the generating generates the digital content preview to include
the first interesting portion based upon the third person being associated with the first social network and the first relationship magnitude being greater than the second relationship magnitude,
the second interesting portion based upon the third person being associated with the second social network, or
the fourth interesting portion based upon the third person being associated with the first social network and the second relationship magnitude being greater than the first relationship magnitude.

13. The method according to claim 12 wherein the determining the first and the second relationship magnitude includes evaluating at least one of a degree centrality, betweenness centrality, closeness, Eigenvalue hub and authority.

14. The method according to claim 12 further wherein the relationship magnitude includes at least one of a family relationship, an employment relationship, a social media relationship status, and an interest in a topic related to the digital content item.

15. The method according to claim 1 further comprising:
identifying a third interesting portion of the digital content item, the third interesting portion identified based upon a fifth input received at a fifth content presentation device, the fifth content presentation device operated by a fifth person associated with the first social network, wherein,
the determining further determines a first role magnitude of the first person within the first social network and a second role magnitude of the fifth person within the first social network, and
the generating generates the digital content preview to include
the first interesting portion based upon the third person being associated with the first social network and the first role magnitude,
the second interesting portion based upon the third person being associated with the second social network, or
the fourth interesting portion based upon the third person being associated with the first social network and the second role magnitude.

16. The method according to claim 15 wherein the digital content item is included within a multiplicity of digital content items having a plurality of subject classifications and the first role magnitude is based upon a first analysis of the multiplicity of digital content items having interesting portions identified by the first person and included with a subject classification associated with the digital content item, and
the second role magnitude is based upon a second analysis of the multiplicity of digital content items having interesting portions identified by the fifth person and included with the subject classification associated with the digital content item.

17. A content distribution server comprising:
a content distributor having a digital memory for storing a digital content item having a plurality of portions, the content distributor for distributing the digital content item to a first content presentation device and second content presentation device;
an interesting portion analyzer coupled to the first and second content presentation devices for receiving a first input signal from the first content presentation device indicative of a first interesting portion of the plurality of portions of the digital content identified by a first person included within a first social network;
a social network analyzer coupled to the first and second content presentation devices and a third content presentation device for determining if a third person operating the third content presentation device is included in either the first social network;
a digital content preview generator coupled to the third content presentation device for generating a first digital content preview of the digital content item including the first interesting portion; and
wherein the interesting portion analyzer is further coupled to receive a second input signal from the second content presentation device indicative of a second interesting portion of the plurality of portions of the digital content identified by a second person included within a second social network;
wherein the digital content preview generator is further coupled to a fourth content presentation device for selecting a preview of the digital content item excluding the first interesting portion and the second interesting portion if a fourth person operating the fourth content presentation device is not associated with either the first social network or the second social network.

18. The content distribution server according to claim 17 wherein the interesting portion analyzer is further coupled to a fifth content presentation device for receiving a third input signal from the fifth content presentation device indicative of a third interesting portion of the plurality of portions of the digital content item identified by a fifth person included within the first social network, the social network analyzer is further coupled to the fifth content presentation device for determining a first relationship magnitude between the third person and the first person and a second relationship magnitude between the third person and the fifth person, and the digital content preview generator generates the digital content preview to include the first interesting portion based upon the third person being associated with the first social network and the first relationship magnitude being greater than the second relationship magnitude, the second interesting portion based upon the third person being associated with the second social network, or the third interesting portion based upon the third person being associated with the first social network and the second relationship magnitude being greater than the first relationship magnitude.

\* \* \* \* \*